United States Patent
Feinberg

(10) Patent No.: US 6,366,891 B1
(45) Date of Patent: Apr. 2, 2002

(54) DATA PROCESSING SYSTEM FOR CONDUCTING A MODIFIED ON-LINE AUCTION

(75) Inventor: Donald A. Feinberg, Cooperstown, NY (US)

(73) Assignee: Vanberg & DeWulf, Cooperstown, NY (US)

( * ) Notice: Subject to any disclaimer, the term of this patent is extended or adjusted under 35 U.S.C. 154(b) by 0 days.

(21) Appl. No.: 09/545,562

(22) Filed: Apr. 7, 2000

Related U.S. Application Data

(60) Provisional application No. 60/180,947, filed on Feb. 8, 2000.

(51) Int. Cl.⁷ .................................................. G06F 17/60
(52) U.S. Cl. ............................................. 705/37; 17/60
(58) Field of Search ...................................... 705/37, 26

(56) References Cited

U.S. PATENT DOCUMENTS

| | | | |
|---|---|---|---|
| 5,774,873 A | * 6/1998 | Berent et al. | 705/26 |
| 5,794,207 A | 8/1998 | Walker et al. | 705/23 |
| 5,890,138 A | * 3/1999 | Godin et al. | 705/26 |
| 5,897,620 A | 4/1999 | Walker et al. | 705/5 |
| 5,960,411 A | 9/1999 | Hartman et al. | 705/26 |
| 6,006,225 A | 12/1999 | Bowman et al. | 705/5 |
| 6,012,045 A | * 1/2000 | Barzilai et al. | 705/37 |
| 6,021,398 A | 2/2000 | Ausubel | 705/37 |
| 6,023,685 A | * 2/2000 | Brett et al. | 705/37 |
| 6,023,686 A | 2/2000 | Brown | 705/37 |
| 6,029,141 A | 2/2000 | Bezos et al. | 705/27 |
| 6,055,518 A | * 4/2000 | Franklin et al. | 705/37 |
| 6,161,099 A | * 12/2000 | Harrington et al. | 705/37 |

FOREIGN PATENT DOCUMENTS

| WO | WO 01/71968 | * 9/2001 | G06F/17/60 |
|---|---|---|---|

OTHER PUBLICATIONS

NewBee at EBAY Ingintor Sellers Protect 81 Change to Minimum Bid or Antros, San Joe Mary News, Aug. 21, 1999.*

* cited by examiner

Primary Examiner—Frantzy Poinvil
Assistant Examiner—Geoffrey Akers
(74) Attorney, Agent, or Firm—Vierra Magen Marcus Harmon & DeNiro LLP

(57) ABSTRACT

A data processing system is disclosed that can be used to conduct a modified auction. A minimum value is determined for an item to be auctioned. Potential bidders are provided the opportunity to buy the rights to bid on the item. When the total proceeds from selling the rights to bid on the item become equal to or greater than the minimum value for the item, an auction is performed for the item. In one embodiment, only those entities that purchased the rights to bid may participate in the auction, and the auction is designed to prevent the auction price from becoming too high.

25 Claims, 8 Drawing Sheets

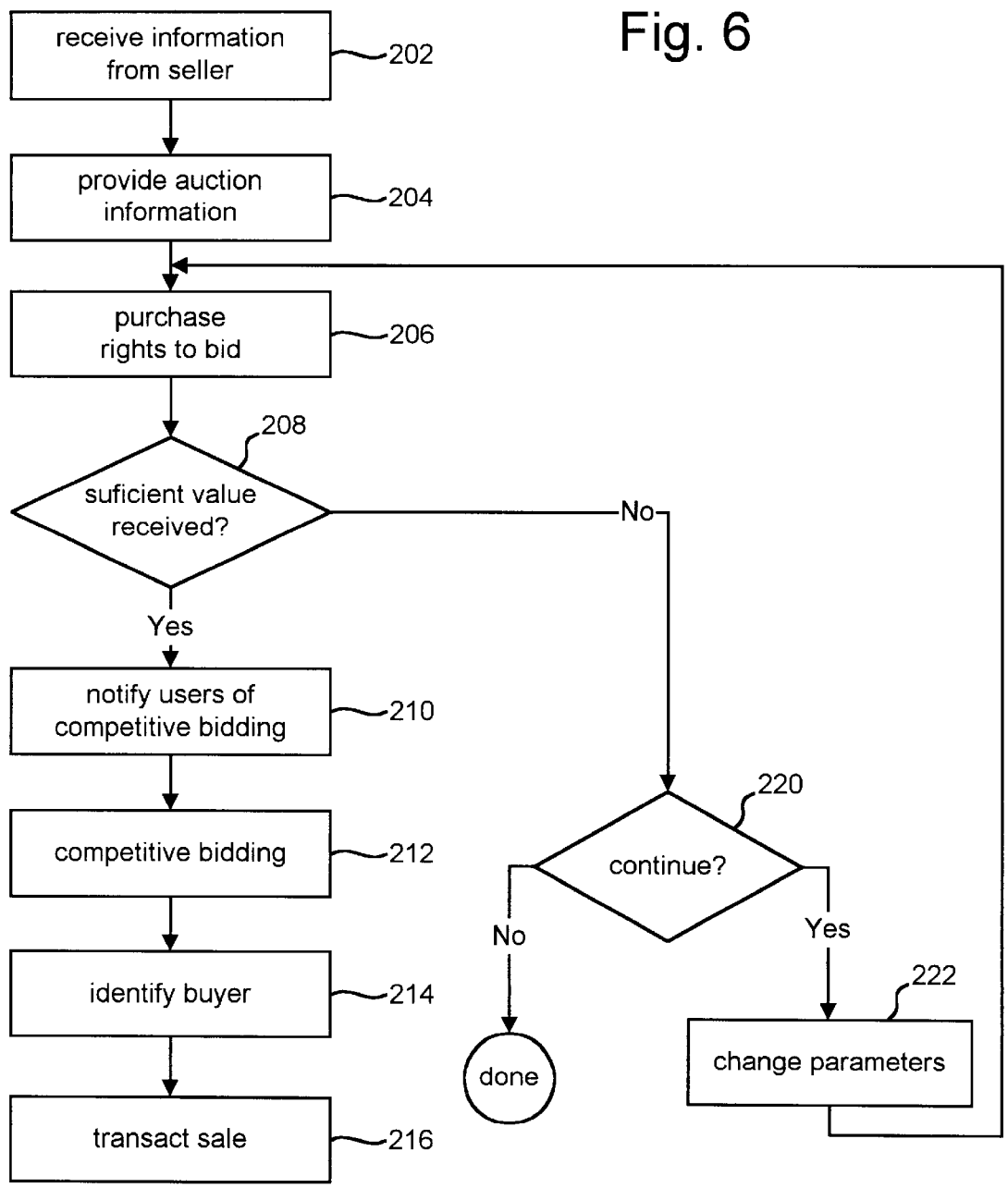

DATA PROCESSING SYSTEM FOR CONDUCTING A MODIFIED ON-LINE AUCTION

CROSS-REFERENCE TO RELATED APPLICATION

This Application claims the benefit of U.S. Provisional Application No. 60/180,947, DATA PROCESSING SYSTEM FOR AGGREGATING AND MONETIZING CONSUMER INTEREST, filed on Feb. 8, 2000. That Provisional Application is incorporated herein by reference.

BACKGROUND OF THE INVENTION

1. Field of the Invention

The present invention is directed to a data processing system for conducting a modified on-line auction.

2. Description of the Related Art

The Internet's impact on the way we live has been rapid and powerful. We can now communicate instantly, globally and around the clock. Communication can be performed textually, graphically, with audio and with video. The impact on how consumers purchase items is one of the most obvious changes brought by the Internet and, perhaps, the one experienced by the greatest number of people. The Internet has increased the efficiency of purchasing, chiefly by increasing the amount of the information brought to a purchase decision. The Internet has also increased the convenience of buying items, by extending the hours when consumers can shop, bringing hard to find items to anyone with an Internet connection and make it viable to deliver all sorts of goods and services by concentrating enough demand to fund a delivery infrastructure.

Although it has increased efficiency and convenience, the Internet has not yet profoundly changed the nature of how consumers purchase. Despite the newfound speed, convenience, knowledge and reach, buyers still meet in some manner to exchange money for goods. But the power of the Internet makes it possible to envision revolutionary new ways to restructure the age old relationships of seller and buyer, changing qualitatively the way value is established, created and exchanged.

Examples of attempts to change the way consumers make purchases using the Internet may be seen at the following web sites: www.ebay.com ("Ebay"); www.mercata.com ("Mercata") and www.priceline.com ("Priceline"). Ebay is a straight auction system. Like other auctions, bidders compete against each other for items. No payment for bidding is required. No price is guaranteed to the seller, except for a reserved auction situation in which the seller does not have to complete the transaction until the seller's reserve price is met. Sometimes, an auction can become heated and the price could exceed the market value of the item. Additionally, on-line auctions tend to be conducted over a number of days, thereby, reducing the entertainment value.

Mercata aggregates consumer demand in order to lower the price of a product. Mercata brings a group of interested buyers to a seller and, based on the number of buyers, negotiates a discount. Priceline can be thought of a reverse auction. Consumers individually make offers to buy airline tickets, hotel rooms, cars, and other items. Priceline shops these offers in real time to various sellers to try to make a match. The consumer must be flexible with brand preference, and must offer a reasonable price. Priceline claims to be able to match most of the offers, providing buyers with savings. When a consumer makes an offer to purchase, the consumer must guarantee that offer so that if Priceline finds a seller the purchase will be automatically transacted.

In all of the examples above, the consumer's interest in the good or service and the sale price is directly tied to the value of that good or service. The Internet is used to find a meeting of the minds for a reasonable price. The power of the Internet is not used to obtain a lower price for the buyer and a higher price for the seller. Additionally, none of the above services add entertainment value to the purchase.

SUMMARY OF THE INVENTION

The present invention, roughly described, provides for a data processing system that can be used to conduct a modified auction. A minimum value is determined for an item to be auctioned. Potential bidders are provided the opportunity to buy rights to bid on the item. When the total proceeds from selling the rights to bid on the item become equal to or greater than the minimum value for the item, an auction is performed for the item. In one embodiment, only those entities that purchase the rights to bid may participate in the auction, and the auction is designed to prevent the auction price from becoming too high. If the minimum value of the item is set to the market value of the item, then the seller has received fair value before the auction begins. The additional proceeds from the auction provide the seller with proceeds above the market value. Meanwhile, the buyer paid a price below the market value. Thus, the present invention allows the interests of many consumers to be aggregated in order to reduce the sale price of an item.

One embodiment of the present invention includes storing a minimum price for selling an item in the computer system and receiving a request at the computer system to purchase rights to bid for the item. The request to purchase rights to bid is fulfilled using the computer system. The computer system determines the sum of purchases of the rights to bid. An auction is conducted for the item if the sum determined to be at least equal to the minimum price.

In various alternatives, different means are used to limit the auction so that the final sale price of the auction is lower than the market price of the item. For example, the bid increment can be restricted to a low number. Alternatively, the auction can be conducted for a very short period of time which maximizes the excitement and prevents the price from rising too high.

In one embodiment, the present invention is performed as an on-line service accessible via the Internet, or other network. The process described above is performed on one or more servers which are connected to the Internet and have access to various databases. In one implementation, the databases store web page data, item data, auction data, bid purchase data and user data. Client computers with access to the Internet (or other network) can access the server and participate in the modified on-line auction.

The present invention can be accomplished using hardware, software, or a combination of both hardware and software. The software used for the present invention is stored on one or more processor readable storage media including hard disk drives, CD-ROMs, optical disks, floppy disks, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

FIG. 6 is a flow chart depicting one embodiment method of the present invention.

DETAILED DESCRIPTION

Figure 1:
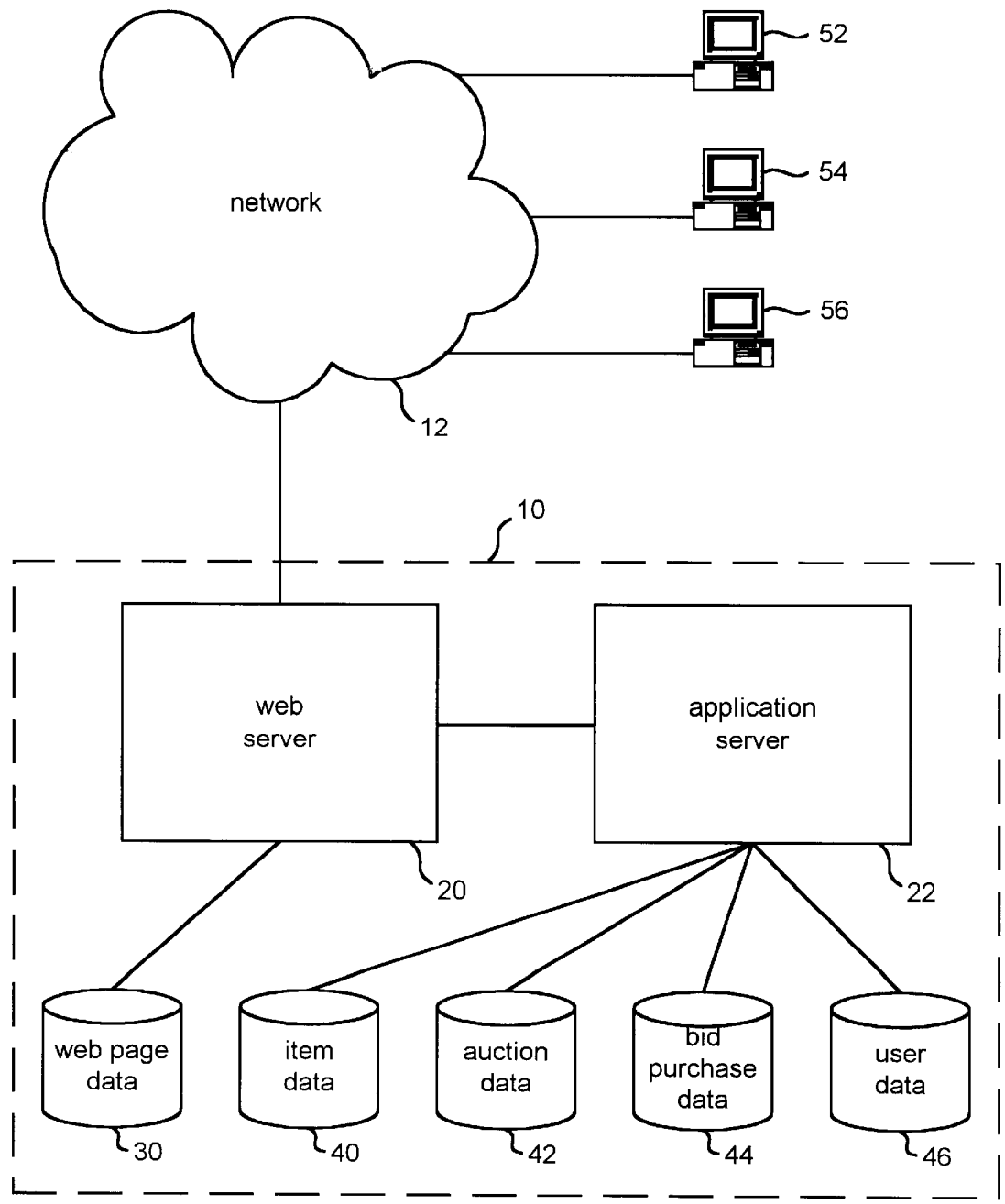
FIG. 1 is a block diagram depicting one embodiment of the present invention.

FIG. 1 is a block diagram depicting one embodiment of the present invention. Specifically, FIG. 1 shows a computer system 10 connected to network 12. A computer system can include one computer or multiple computers (or other devices), and can include multiple computers in different locations operating as a system. Network 12 can be a local area network, a wide area network, a virtual private network, the Internet, an Intranet, or some other network suitable for use with the present invention.

In one embodiment, computer system 10 is used to provide a modified auction. A minimum value is determined for an item to be auctioned. Potential bidders are provided the opportunity to buy the rights to bid on the item (e.g. purchase bids). When the total proceeds from selling the rights to bid on the item become equal to or greater than the minimum value for the item, an auction is performed for the item. In one embodiment, only those entities that purchased the rights to bid may participate in the auction, and the auction is designed to prevent the auction price from becoming too high. Other variations and embodiments of the above description are within the spirit of the present invention. In one embodiment, the cost of the rights to bid is set at a very low price so that a user would pay the price for the entertainment value of the auction and the chance to receive a great deal on the item. In one alternative, the price is set so that the price multiplied by the number of expected entities participating in the auction will be equal to the minimum price.

Computer system 10 includes a web server 20 and an application server 22. In one embodiment, web server 20 and application server 22 include one or more processors, memory, a disk drive, input devices, output devices, network interfaces (e.g. modem, router, Ethernet card, etc.), and other peripherals, etc. In one embodiment of the present invention, network 12 is the Internet and computer system 10 provides a web site that is accessible over the Internet. In that embodiment, web server 20 provides a user interface with users of computer system 10 by preparing and displaying web pages. In communication with web server 20 is web page data 30 which is used by web server 20 to prepare and provide web pages. In one embodiment, web page data 30 can be stored as part of web server 20. In other embodiments, web page data 30 can be stored in a separate storage medium.

Application server 22 performs the core functionality of the present invention, and is in communication with web server 20. In one embodiment, application server 22 instructs web server 20 to display certain web pages, and web server 20 communicates user input to application server 22. FIG. 1 shows application server 22 in communication with item data 40, auction data 42, bid purchase data 44 and user data 46. Each of the databases 40–46 can be separate databases stored in separate storage devices, can be combined into one or more than one storage device, can be stored separately from application server 22 (but in communication with application server 22) or can be stored within application server 22. Item data 40 stores information with each of the items being sold, transferred, auctioned, exchanged, etc. Auction data 42 stores data about a specific auction being conducted by computer system 10. Bid purchase data 44 provides data about purchases of the rights to bid (to be explained below). User data 46 provides information about various users utilizing computer system 10.

FIG. 1 also shows three computers 52, 54 and 56 connected to network 12. In one embodiment, computers 52, 54 and 56 use browsers to access computer system 10 via the Internet. Computers 52, 54 and 56 are used by users (e.g. sellers and bidders) to access the modified on-line auction services. Although three computers are depicted, more or less than three will work with the present invention. In another embodiment, users can access the services of computer system 10 using a telephone, a handheld or palm computers, a wireless device or any other suitable means.

Figure 2:
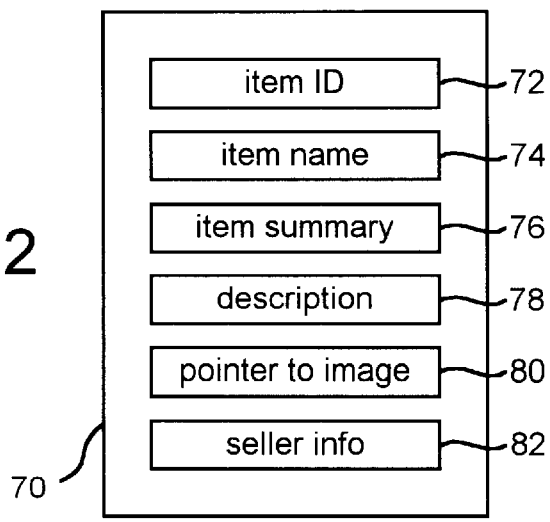
FIG. 2 depicts a sample format for storing information about an item.

FIG. 2 depicts a sample format for records stored in item data 40. Record 70 has six fields. Item ID field 72 stores an identification of the particular record. Item name field 74 stores the name of the item. Item summary field 76 stores a text summary description of the item to be sold. Description field 78 stores a full text description of the item. Pointer to image field 80 is a pointer (or link) which points to the location in the database where an image of the item is stored. Images can be stored in JPEG format, TIFF format, GIF format, BMP format, or any other suitable electronic format. Seller info field 82 stores information about the seller. This information could include prior history of the seller's transactions, comments from previous buyers who purchased items from the seller, and other information about the seller.

Figure 3A:
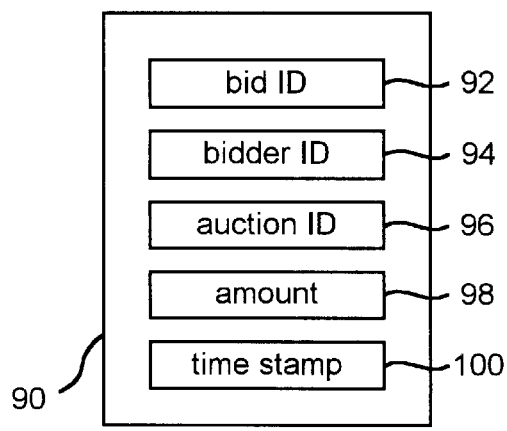
FIGS. 3a–3d provides sample formats for storing auction data.

FIGS. 3a–3d provide sample formats for the various data records stored in auction data 42. FIG. 3a depicts record 90 which stores information about a particular bid. Record 90 includes five fields. Bid ID field 92 stores an identifier for the particular record 90. Bidder ID field 94 stores identification number of the entity making the bid. The entity making the bid for an item could be a person, an organization, or another entity. Bidder ID field 94 can be used to access bidder information in user data 46. Auction ID field 96 is identification of the particular auction that the bid pertains to. Auction ID field 96 is used to access a particular auction record (see FIG. 3b). Time stamp 100 indicates the time and date that the bid was received by computer system 10.

Figure 3B:
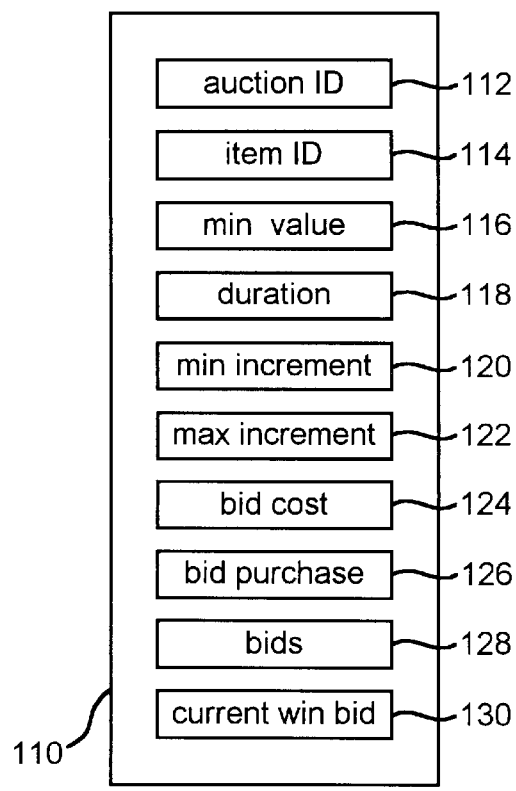

FIG. 3b depicts record 110 which stores the information about a particular auction. Record 110 includes ten fields. Auction ID field 112 is an identifier of record 110. Item ID field 114 stores an identification of the item. This field corresponds to the item ID field 72 of FIG. 2 and is used to point to a particular item record 70. Minimum value field 116 stores the minimum value that the seller is willing to accept for the particular item being sold. In some cases, the minimum value is equal to the market value of an item. Note that the term "item" is used to mean a product or a service. Duration field 118 stores the maximum duration of the auction. In one embodiment, the value in duration field 118 is set by computer system 10. In other embodiments, the seller of the item can provide the duration number. Minimum increment field 120 stores the minimum value by which a particular bid must be greater than the previous high bid. Maximum increment field 122 stores the maximum value by which a particular bid can deviate from a previous high bid. Bid cost field 124 is the cost a user must pay to purchase the rights to bid (e.g. the cost to buy the bid). Bid purchase field 126 is a pointer to a record which stores a list of all the purchases of the rights to bid for the particular auction. Bids field 128 is a pointer to a record storing a list of all the bids for the auction. Current win bid field 130 stores the information about the current winning bid (e.g. the current high bid).

Figure 3C:
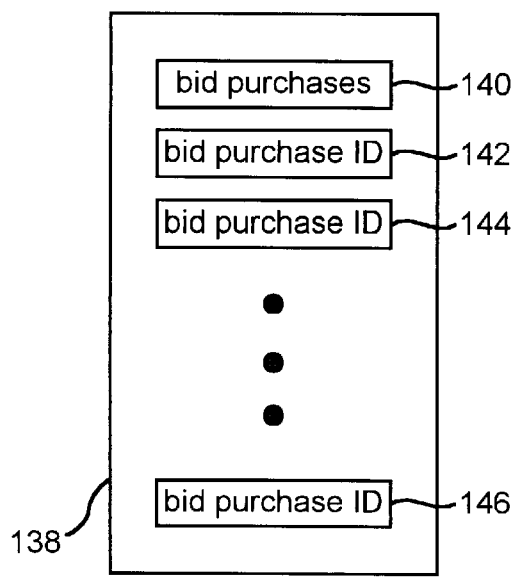

FIG. 3c depicts record 138 which stores information about the purchases of the rights to bid. The first field in record 138 is bid purchases field 140 which identifies record 138. Note that bid purchases field 140 corresponds to bid purchases field 126. Thus, field 126 is a pointer to the appropriate record 138. Additionally, record 138 includes a set of bid purchase ID's (e.g. 142, 144 . . . 146) which identify each bid purchase by pointing to a record in bid purchase data 44.

Figure 3D:
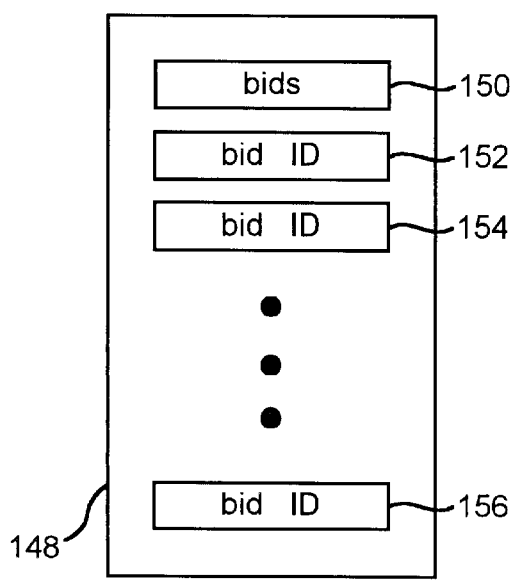

FIG. 3d depicts record 148 which stores information about the bids for the particular auction. The first field of record 148 is bids field 150 which is an identifier of record 148. Bids field 150 corresponds to bids field 128 of FIG. 3b. Thus, bids field 128 of FIG. 3b is a pointer to the appropriate record 148. Record 148 also stores a set of bid ID's (e.g. 152, 154 . . . 156) which identify and point to the records 90 for all the bids made for the particular auction.

Figure 4:
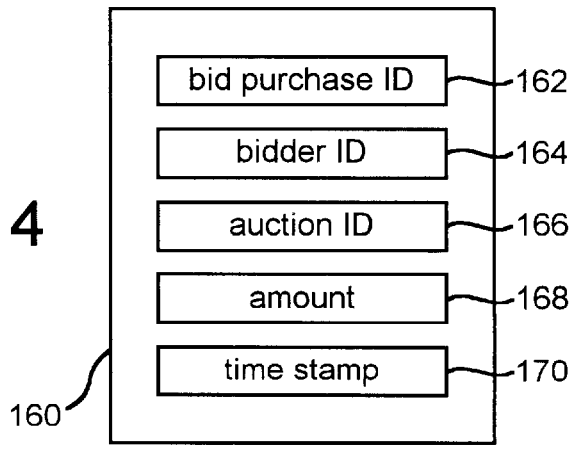
FIG. 4 depicts a sample format for storing bid purchase data.

FIG. 4 depicts a sample format for storing bid purchase data. Record 160 includes five fields. The first field is bid purchase ID field 162, which is an identifier of record 160. Note that bid purchase ID field 162 corresponds to one of the bid purchase ID's in record 138. Thus, each of the bid purchase ID's in record 138 are pointers to the appropriate record 160. Record 160 also includes a bidder ID field 164 which identifies the particular bidder who made the purchase. Auction ID field 166 identifies the particular auction that the purchase was made for. Auction ID field 166 corresponds to the auction ID field 112 of a particular record 110. Amount field 168 stores the amount that the bidder paid to purchase the rights to bid. Time stamp field 170 stores a time and day indicative of when computer 110 received the purchase of the rights to bid.

Figure 5:
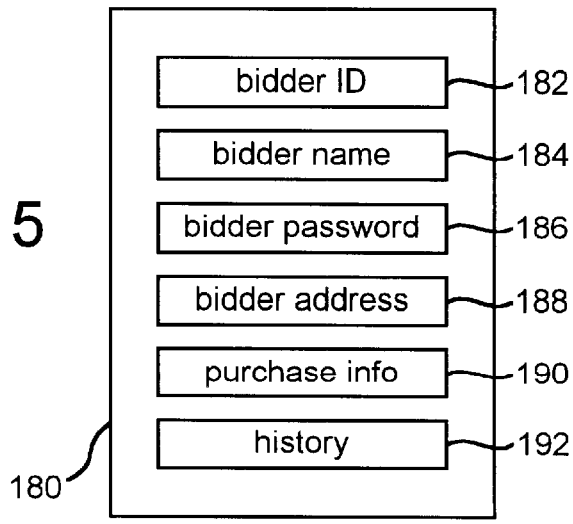
FIG. 5 depicts a sample format for storing user data.

FIG. 5 is an example of the format for storing user data. Record 180 stores six fields. Bidder ID field 182 stores the identification of the particular record. Note that bidder ID field 182 corresponds to bidder ID field 164 and bidder ID field 94. Thus, bidder ID field 94 and bidder ID field 164 are pointers to bidder ID field 182. Record 180 also includes bidder name field 184, which is the text of the bidder's name. Bidder password field 186 is a password created by the bidder. Bidder address field 188 is the bidder's address. Purchase information field 190 includes all the information necessary for the bidder to make a purchase. In one embodiment, this includes the bidder's credit card number, expiration date and indication of the type of credit card. Alternatively, purchase information field 190 could include bank account information or other data to effectuate a purchase. History field 192 stores historical bidding and purchase information for this particular bidder.

FIG. 6 is a flow chart describing one embodiment of a method of the present invention. In step 202, computer system 10 receives the information from the seller. This information includes information about the seller, information about the auction and information about the item to be auctioned. In step 204, computer system 110 provides auction information. This includes web server 20 providing various web pages for users to access via network 12. These web pages will include information about the auction itself, including the item, the cost of purchasing the rights to bid and various information about the auction. In step 206, computer system 10 allows bidders to purchase the rights to bid. For purposes of this document, purchasing the right to bid, purchasing bids, bid purchases and purchasing bid rights all mean the same thing. Step 206 could be limited in time, can be limited by the number of purchases made or can be limited by the amount of the sum of the purchases. After step 206 is complete, computer system 10 decides whether sufficient value has been received for all the purchases of the rights to bid. In one embodiment, step 208 includes determining a sum of all of the purchases of the rights to bid. If the sum equals the seller's minimum price, then sufficient value has been received. In other embodiments, sufficient value is received if a predetermined percentage of the minimum value has been received. In another embodiment, the system determines the minimum number of purchases of rights to bid that need to be received to meet the seller's minimum price. When that number of purchases of rights to bid have been received, the test of step 208 is satisfied.

If sufficient value was received, then computer system 10 notifies the users that competitive bidding will begin in step 210. This notification could be made via a web page using web server 20. Alternatively, a user can be notified by email, telephone or some other communication means. In one embodiment, only users who purchase the rights to bid for the particular item will be notified. In other embodiments, additional users can also be notified. In step 212, competitive bidding takes place for the particular item in question. In step 214, a buyer of the item is identified. The buyer is the entity with the highest bid from step 212. In step 216, the sale is transacted. If in step 208 computer system 10 determines that the sufficient value was not received for the rights to bid, then the method loops to step 220 and determines whether the auction process should continue. If not, the method of FIG. 6 is done. If so, the parameters for purchasing rights to bid can be changed in step 222 and the method loops back to step 206. In one embodiment, the determination of whether to continue in step 220 and to change the parameters in step 222 is defined by the seller in step 202. In other embodiments, computer system 10 will make a decision based on the number of entities purchasing rights to bid and the minimum price for the item.

Figure 7:
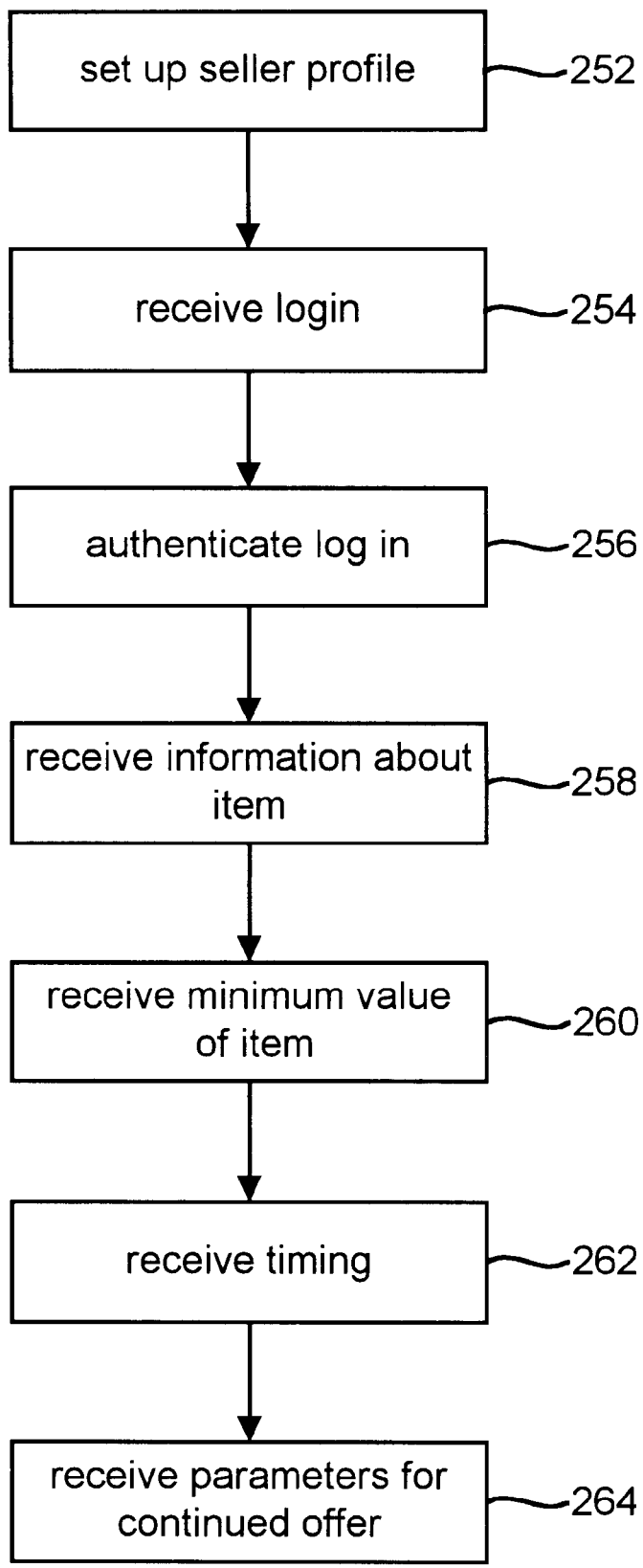
FIG. 7 is a flow chart depicting a method for receiving information from a seller.

FIG. 7 is a flow chart describing the process of receiving information from the seller. In step 252, the seller sets up a seller profile. The seller does this using web pages on web server 20. The seller profile includes information about the seller such as prior history, address, user name, log in name, password, etc. If a seller profile already exists, then step 252 can be skipped. In step 254, the seller logs in. In step 256, computer system 10 authenticates the log in by checking the password and user name. In step 258, computer system 10 receives information about the item from the seller. The information is received via web server 20. The information about the item can include the summary of the item, description of the item, an image file. In step 260, computer system 10 receives the minimum value the seller will accept for the item. In step 262, computer system 10 receives timing information from the seller. This can include how long the process of selling rights to bid should be and how long the auction should last. In one embodiment, one or both timing information variables are determined by computer system 10 rather than the seller. In step 264, the seller can input parameters for continued offering of rights to bid. This is the data used to make decisions in step 220 and 222 in FIG. 6. For example, the seller can indicate that if purchases of rights are equal to a predetermined amount of the minimum price, then continue to sell rights to bid. In one embodiment, the seller can indicate to raise or lower the price to purchase rights to bid.

Figure 8:
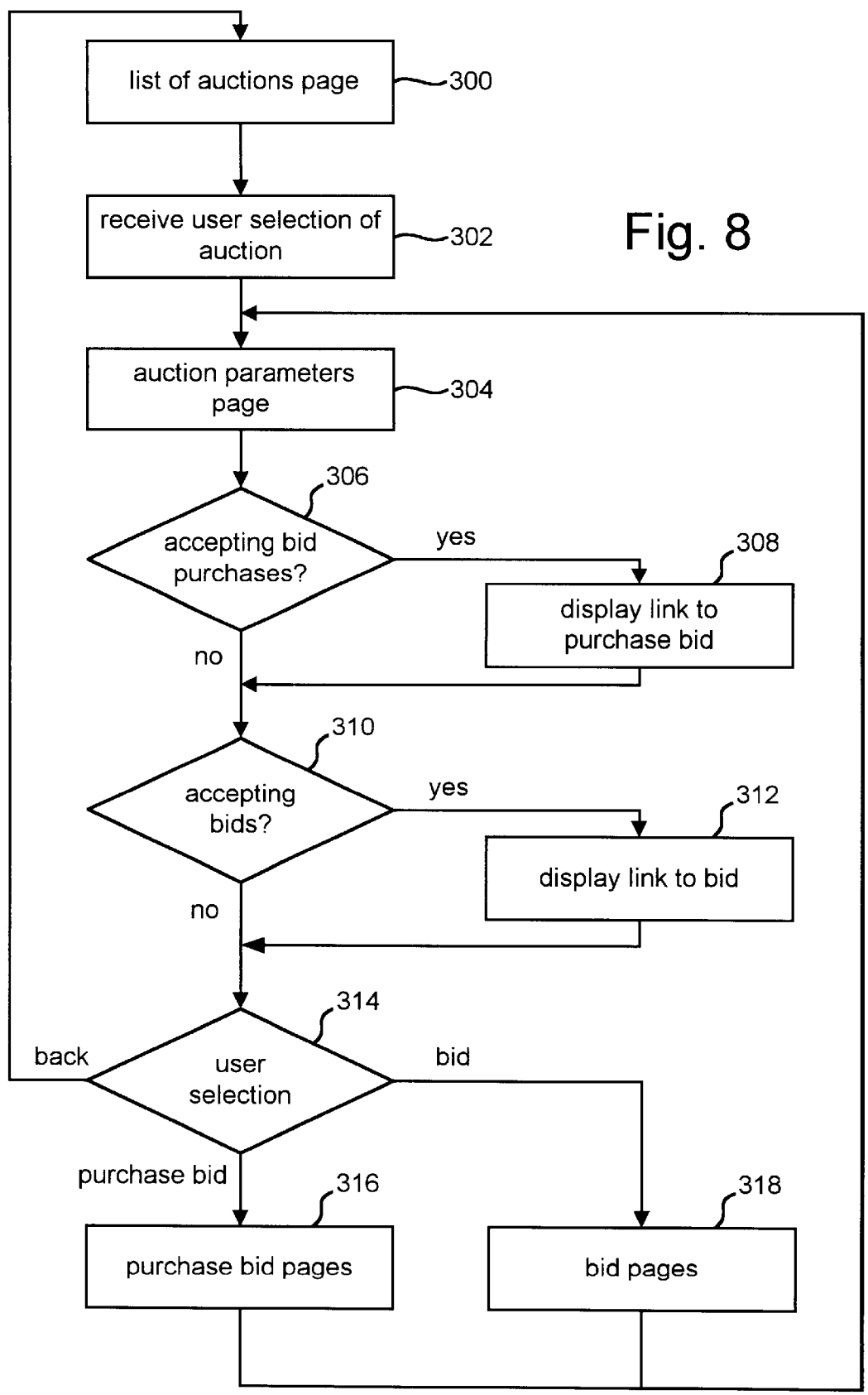
FIG. 8 is a flow chart depicting a process for interfacing with a user.

FIG. 8 is a flow chart describing the process for interfacing with a user. The steps of FIG. 8 are primarily performed by web server 20 using web page data 30 and information from application server 22. In step 300, web server 20 provides a web page which lists all of the auctions available on computer system 10. In step 302, web server 20 receives a selection of an auction from a user accessing web server 20 over network 12. In step 304, web server 20 displays a web page showing the auction parameters for the selected auction. In step 306, if computer system 10 is still accepting purchases of the rights to bid, a link is displayed in step 308 that allows the user to purchase the rights to bid. In step 310, if the system is accepting bids for an auction, then a link is displayed in step 312 which allows a user to add a bid to the auction. In step 314, web server 20 receives a selection to make a bid, purchase rights to bid or go back to the previous page. If the user selects to go back to the previous page, the method loops back to step 300. If the user selects to purchase rights to bid, then the various web pages for purchasing rights to bid are provided in step 316. If the user selected to make a bid, then the various web pages for making a bid are provided in step 318. After making a bid or purchasing the rights to bid, the method loops back to step 304. If the user is using a standard web browser known in the art, the user typically has the option of going back to a previous page.

In one embodiment, the web site implementing the user interface described by FIG. 8 includes a home page with multiple tabs along the top of the page. Each tab identifies a category, such as autos, homes, travel, jewelry, sundries, etc. If the user selects a tab, the user is presented with a page that identifies opportunities to purchase the rights to bid or participate in a modified auction for items within the category identified by the selected tab. In one implementation, for each opportunity to purchase rights to bid, the page will describe the item, the cost of rights to bid, the number of bid rights still available for purchase and the estimated time left until the modified auction. The user can also be provided with a means to search all product available.

Figure 9:
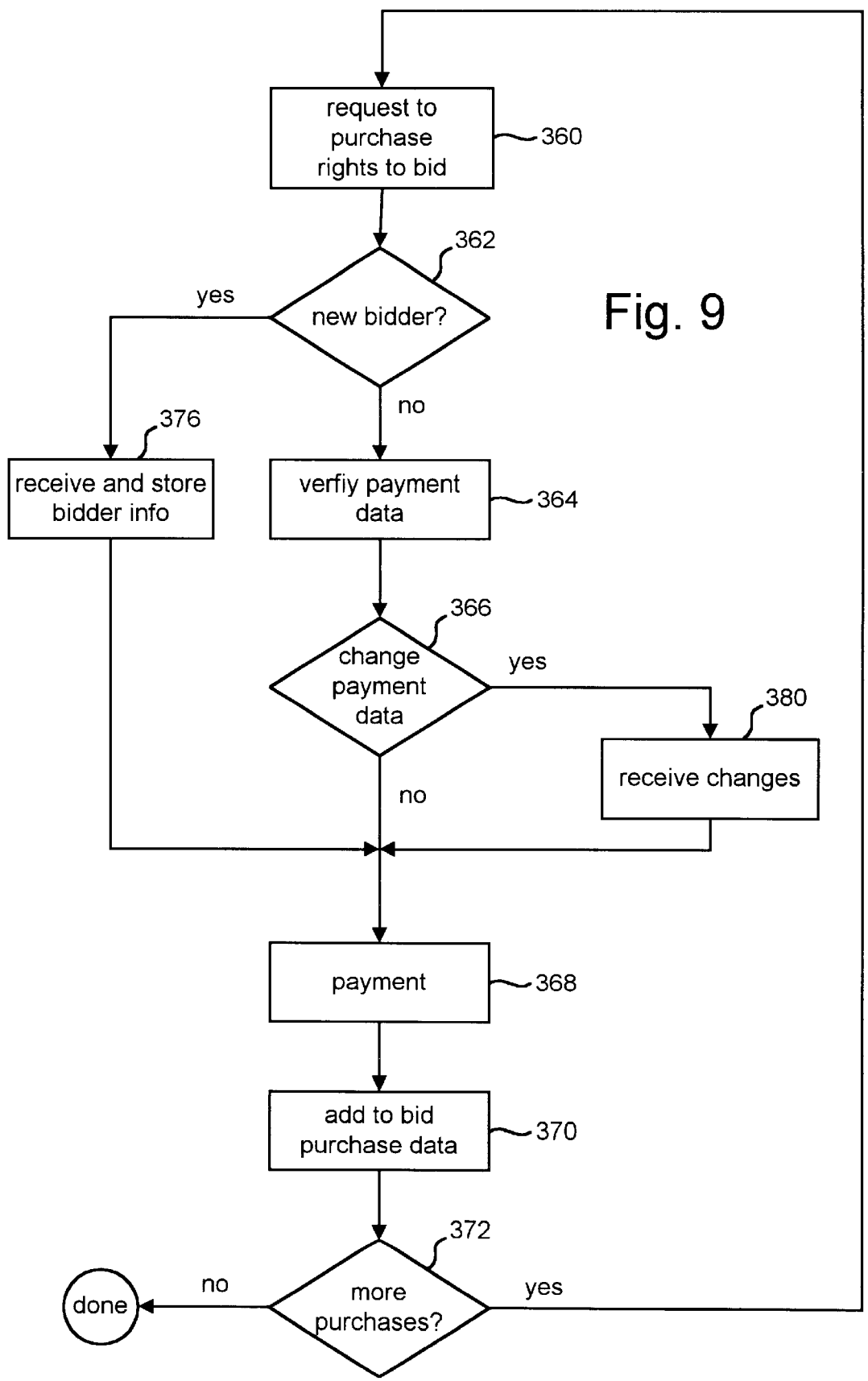
FIG. 9 is a flow chart depicting a method for receiving requests to purchase rights to bid and fulfilling those requests.

FIG. 9 is a flow chart depicting the method for receiving requests to purchase the rights to bid and fulfilling those requests. In step 360, computer system 10 receives a request to purchase the rights to bid. It can be in the form of the user selecting the link in the web pages described above, or another suitable form to request a purchase. In step 362, computer system 10 determines whether it is a new bidder or a known bidder. If it is a known bidder, then in step 364, computer system 10 verifies payment data for the purchase. The rights to bid has a set cost. This price will be displayed to the user on the pages discussed above with respect to FIG. 8. In one embodiment, the user pays for the rights to bid via a credit card transaction. In step 364, the bidder's password is verified and the bidder's credit card payment information is displayed. In step 366, the bidder is given the option to change the payment information. If the payment information has not changed then, in step 368, the user pays for the rights to bid by completing the transaction. In step 370, a new record 160 is added to bid purchase data 44 for the new purchase of the rights to bid. In step 372, computer system 10 determines whether it will receive any more purchases. If not, the method of FIG. 9 is completed. If so, the method loops back to step 360. In one embodiment, the system will continue to accept new purchases of rights to bid until the sum of all the purchases of rights to bid is equal to or greater than the minimum price. In one embodiment, the process of FIG. 9 will be limited in time so that if at certain predetermined time period passes, the method of FIG. 9 will automatically terminate.

Note, in step 362, if it is determined that the bidder is new, then the method of FIG. 9 loops to step 376. In step 376, computer system 10 receives and stores new bidder information. This new information is stored in record 180 of user data 46. In step 366, if the user decides to change the payment data then, in step 380, new payment data can be entered into and received by computer system 10. That new payment data is stored in field 190 of record 180.

Figure 10:
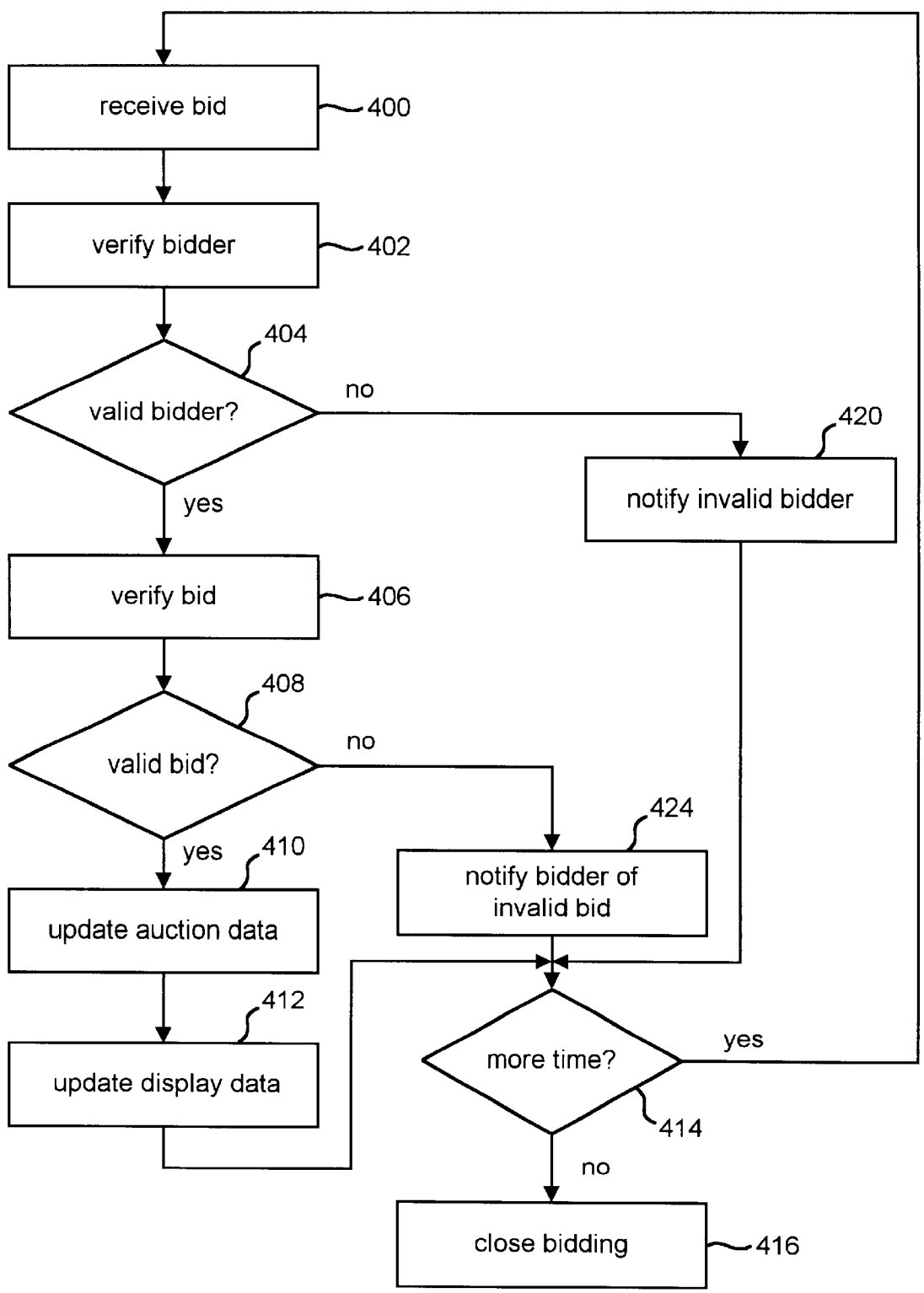
FIG. 10 is a flow chart depicting a method for competitive bidding.

FIG. 10 is a flow chart depicting a method for conducting a competitive bidding session. In step 400, computer system 10 receives a bid. The bid includes the name of the bidder, an identification of the item, an identification of the auction and an amount. In step 402, computer system 10 verifies the bidder. That is, when a bidder places a bid, the bidder is required to enter a user name and password. In step 402, computer system 10 verifies that the bidder exists in user data 46. Step 402 also includes determining whether the bidder making the bid purchased rights to bid for this particular auction. This is done by accessing bid purchase data 44 in order to find a record 160 that has a bidder ID field 164 matching the bidder attempting to make a bid. If the bidder is a valid bidder in the system who has purchased rights to bid in this particular auction, then in step 406, computer system 10 determines whether the bid is valid. In one embodiment, each auction has a minimum increment and a maximum increment. The difference between the bid received in step 400 and the current high bid must be greater than or equal to the minimum increment and less than or equal to the maximum increment. In some embodiments, there is no minimum increment. In other embodiments, there is no maximum increment. If the bid is within the minimum and maximum increments, then it is a valid bid (step 408) and the method loops to step 410 to update the auction data. In one embodiment, step 410 includes changing current win bid field 130 of record 110, adding a new bid ID field into record 148, and adding a new record 90. In step 412, web server 20 updates the auction data in any of the web pages being displayed to indicate a new high bid. In step 414, the system determines whether there is any more time left in the auction. The duration of the auction is set by field 118 of FIG. 3*b*. If there is more time left in the auction, then the method loops back to step 400. If there is no more time, then bidding is closed in step 416.

In step 404 of FIG. 10, if it is determined that the bidder is not a valid bidder, then in step 420 error information is displayed to the invalid bidder. In some embodiments, an auction may be open to people who did not purchase rights to bid. In this case, an invalid bidder would be someone who did not have an account in computer system 10 and step 420 would allow them the opportunity to open an account and enter a bid. In step 408, if the bid is not valid (e.g. because it violates the minimum and maximum increments) then the user is notified of the invalid bid in step 424. After steps 420 and 424, the method loops to step 414.

In one embodiment, the seller sets the minimum price to be the market price of the good. Thus, when all of the rights to bid have been purchased, the seller has already received the market value of the good, and the proceeds from the competitive bidding will provide the seller with additional proceeds beyond the market price. During the auction of step 212, the maximum increment is set to a small number as compared to the market price and the duration of the auction is set to a short time. By having a short bidding process and only allowing small increments in each bid, it is likely that the final auction price will be far below the market price of the good. Thus, the bidder who wins the auction will be purchasing the good at a price much lower than the market price. The bidders who did not win the auction only paid a small fee to purchase the right to bid. Because the auction is short and allows for many bids due to the small increments, all the bidders would be able to participate in an exciting auction. Thus, the auction will provide entertainment value, even to those who did not win the auction.

Consider, for example, a seller attempting to sell a radio. The market price for that radio is $200.00. In one alternative, the seller sets a minimum value of the item to be $200.00. The cost of purchasing rights to bid on the item is set at $1.00 with the expectation that 200 persons will pay for the right to bid on the radio. When 200 people have purchased the rights to bid on the radio, the auction begins. In this example, assume that the maximum bid increment is 50¢ and there is no minimum bid increment. The duration of the auction is set to fifteen minutes. Thus, it is likely that the final cost of the radio at the conclusion of the auction will be significantly less than $200.00 (e.g. $35.00). Despite the low final sale price, the seller received more than the market value of the radio (e.g. $200.00+$35.00) and the winning buyer paid far less than the market value of the radio (e.g. $35.00+$1.00). The entities losing the auction only paid $1.00 for the entertainment of the auction and the chance of buying a radio for $35.00. In one embodiment, a service providing computer system 10 can charge a fee as a percentage of the seller's proceeds, or can change a set fee.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for conducting a modified on-line auction process, comprising the steps of:

storing, in a computer system, a threshold value for auctioning an item;

receiving requests at said computer system to purchase rights to bid for said item;

fulfilling said requests to purchase rights to bid using said computer system;

determining a sum of an aggregate of said purchases of rights to bid using said computer system; and conducting an on-line auction for said item only if said sum of said aggregate of said purchases of rights to bid is at least equal to said threshold value, said step of conducting being performed by said computer system, said auction has a final price, said aggregate of said purchases of rights to bid being used to allow said final price to be lower than a market price for said item.

2. A method according to claim 1, wherein:

said auction is limited to only accepting bids from entities who purchased said rights to bid.

3. A method according to claim 1, wherein:

said auction has a maximum bid increment.

4. A method according to claim 1, wherein:

said auction is limited in time.

5. A method according to claim 1, wherein said step of conducting an on-line auction includes the steps of:

receiving a plurality of bids at said computer system;

accepting bids of said plurality of bids from bidders who purchased rights to bid;

determining a highest bid; and reporting said highest bid.

6. A method according to claim 1, wherein:

said auction is limited to only accepting bids from entities who purchased said rights to bid; and said auction has a maximum bid increment and is limited in time in order to prevent said final price from being greater than or equal to said market price.

7. A method according to claim 1, further comprising the step of:

sending notifications of said auction to entities whose request to purchase rights to bid have been fulfilled.

8. A method according to claim 1, wherein:

said step of conducting said auction includes a step of transacting a sale of said item.

9. A method for conducting a modified on-line auction process, comprising the steps of:

receiving requests at a computer system to purchase bid rights for an item;

fulfilling said requests to purchase said bid rights using said computer system;

storing a threshold for said bid rights for said item;

determining whether an aggregate of said fulfilled requests to purchase said bid rights satisfies said threshold; and conducting an on-line auction for said item only if said aggregate of said fulfilled requests to purchase said bid rights satisfies said threshold, said step of conducting includes accepting bids for said item at said computer system only from entities who purchased said bid rights, said auction has a final price, said aggregate of said fulfilled requests being used to allow said final price to be lower than a market price for said item.

10. A method according to claim 9, wherein said auction includes the steps of:

said auction has a maximum bid increment and is limited in time in order to prevent said final price from being greater than or equal to said market price.

11. A method according to claim 9, wherein:

said threshold includes a minimum number of purchases of said bid rights.

12. A method according to claim 9, wherein:

said threshold includes a minimum amount of value received for said bid rights.

13. A method for participating in a modified auction, comprising the steps of:

receiving auction information at a first computer from a second computer;

sending a first request to purchase rights to bid from said first computer to said second computer;

receiving information at said first computer that an auction for an item will start, said information communicated only after a determination that a set of requests to purchase rights to bid satisfy a threshold for said auction, said set of requests to purchase said rights to bid include said first request, said auction has a final price, said set of requests being used to allow said final price to be lower than a market price for said item; and participating in said auction using said first computer.

14. A method according to claim 13, wherein:

said auction is limited in time and has a maximum incremental bid in order to prevent said final price from being greater than or equal to said market price.

15. A method according to claim 13, further comprising the steps of:

receiving information at said first computer that said request to purchase rights to bid was fulfilled.

16. A method according to claim 15, wherein:

said step of sending a request is performed on behalf of a first entity; and said step of participating in said auction is performed one behalf of said first entity contingent on fulfilling said request to purchase rights to bid.

17. One or more processor readable storage devices having processor readable code embodied on said processor readable storage devices, said processor readable code for programming one or more processors to perform a method comprising the steps of:

receiving requests to purchase rights to bid for an item;

fulfilling said requests to purchase said rights to bid; and conducting an auction for said item only if a threshold for an aggregate of said rights to bid for said item has been met, said step of conducting an auction includes accepting bids for said item at said computer system only from entities who purchased said rights to bid, said auction has a final price, said aggregate of said rights to bid being used to allow said final price to be lower than a market price for said item.

18. One or more processor readable storage devices according to claim 17, wherein:

said auction has a maximum bid increment and is limited in time in order to prevent said final price from being greater than or equal to said market price.

19. One or more processor readable storage devices according to claim 17, wherein:

said threshold is a minimum price; and said threshold has been met if a sum of said aggregate of said purchases of said rights to bid is equal to or greater than said minimum price.

20. One or more processor readable storage devices according to claim 19, wherein:

said step of accepting bids is only performed for a predetermined amount of.

21. A system for conducting a modified auction on a network, comprising:

a processor;

a communication interface in communication with said processor and said network; and a storage device in communication with said processor, said storage device stores program code for programming said processor to perform a method comprising the steps of:

receiving requests to purchase rights to bid for an item, fulfilling said requests to purchase said rights to bid, determining whether an aggregate of said fulfilled requests to purchase said rights to bid satisfies a threshold for auctioning said item, and conducting an auction for said item only if said aggregate of said fulfilled requests to purchase said rights to bid satisfies said threshold for auctioning said item, said auction has a final price, said aggregate of said fulfilled requests being used to allow said final price to be lower than a market price for said item.

22. An apparatus according to claim 21, wherein:

said step of conducting a limited auction includes accepting bids for said item only from entities who purchased said rights to bid.

23. An apparatus according to claim 21, wherein:

said threshold is a minimum price for selling said item.

24. An apparatus according to claim 21, further comprising:

an auction database in communication with said processor;

a bidder database in communication with said processor; and a bid purchase database in communication with said processor.

25. An apparatus according to claim 21, wherein:

said auction has a maximum bid increment and is limited in time in order to prevent said final price from being greater than or equal to said market price.

* * * * *

UNITED STATES PATENT AND TRADEMARK OFFICE
CERTIFICATE OF CORRECTION

| | | |
|---|---|---|
| PATENT NO. | : 6,366,891 B1 | Page 1 of 1 |
| DATED | : April 2, 2002 | |
| INVENTOR(S) | : Feinberg | |

It is certified that error appears in the above-identified patent and that said Letters Patent is hereby corrected as shown below:

Column 12,
Line 8, after "of" and before "." insert -- time --

Signed and Sealed this

Seventeenth Day of August, 2004

JON W. DUDAS
*Acting Director of the United States Patent and Trademark Office*